United States Patent [19]

Mann

[11] Patent Number: 6,003,132
[45] Date of Patent: Dec. 14, 1999

[54] METHOD AND APPARATUS FOR ISOLATING A COMPUTER SYSTEM UPON DETECTION OF VIRUSES AND SIMILAR DATA

[75] Inventor: Steven D. Mann, Stockbridge, Ga.

[73] Assignee: RVT Technologies, Inc., Lilburn, Ga.

[21] Appl. No.: 08/955,912

[22] Filed: Oct. 22, 1997

[51] Int. Cl.[6] .................................................. G06F 13/00
[52] U.S. Cl. .......................................... 713/200; 713/201
[58] Field of Search ..................................... 713/200, 201

[56] References Cited

U.S. PATENT DOCUMENTS

| | | | |
|---|---|---|---|
| 3,609,697 | 9/1971 | Blevins | 340/172.5 |
| 5,121,345 | 6/1992 | Lentz | 364/550 |
| 5,126,728 | 6/1992 | Hall | 340/825.3 |
| 5,414,833 | 5/1995 | Hershey et al. | 395/575 |
| 5,434,562 | 7/1995 | Reardon | 340/825.34 |
| 5,550,818 | 8/1996 | Brackett et al. | 370/60 |
| 5,559,814 | 9/1996 | Rolin et al. | 371/67.1 |
| 5,572,590 | 11/1996 | Chess | 380/4 |
| 5,613,002 | 3/1997 | Kephart et al. | 380/4 |
| 5,815,571 | 9/1998 | Finley | 380/4 |
| 5,826,013 | 10/1998 | Nachenberg | 186/395 |
| 5,832,208 | 11/1998 | Chen et al. | 395/187.01 |

*Primary Examiner*—Norman Michael Wright
*Attorney, Agent, or Firm*—Needle & Rosenberg, P.C.

[57] ABSTRACT

An apparatus for isolating data receiving entity from a data sending entity includes a first data channel, coupled to the data sending entity, and a second data channel, coupled to the data receiving entity. A processor is programmed to compare a plurality of data words received from the first data channel to at least one data word characteristic of a data virus and to assert a control signal when a data word received from the first data channel corresponds to a data word characteristic of a data virus. An optical isolator is capable of isolating the first data channel from the second data channel when the processor detects a data virus. A controllable power supply is responsive to the control signal from the processor and coupled to the optical isolator, which provides power to the optical isolator only when the control signal from the processor is not asserted.

9 Claims, 2 Drawing Sheets

METHOD AND APPARATUS FOR ISOLATING A COMPUTER SYSTEM UPON DETECTION OF VIRUSES AND SIMILAR DATA

BACKGROUND OF THE INVENTION

1. Field of the Invention

This invention relates to computer systems. More particularly, this invention relates to a method and apparatus for isolating a computer system upon detection of a virus and similar data.

2. The Prior Art

Recently, transmission of data viruses over the Internet has become a serious concern for Internet users. To reduce the concern, several methods are used to isolate computers from the Internet while the users are in local mode. However, when users of such methods are in a connected mode, they become prey to any virus that they may unwittingly download.

Computer virus scanners are common and can be used to detect a virus once it is downloaded. However, such scanners cannot prevent the virus from being downloaded. They can only aid in the identification of a virus once it has already infected the user's computer.

Nowhere does the prior art disclose a method or apparatus for detecting a virus as it is being received from a network and isolating the user's computer from the Internet when an incoming virus is detected.

SUMMARY OF THE INVENTION

The above-noted disadvantages of the prior art are overcome by the present invention, which in one aspect is an apparatus for isolating a data receiving entity from a data sending entity. A first data channel is coupled to the data sending entity and a second data channel is coupled to the data receiving entity. A processor is operationally coupled to the first data channel and detects a data virus received from the first data channel. An isolation circuit that is responsive to the processor couples the first data channel to the second data channel when the processor does not detect a data virus and isolates the first data channel from the second data channel when the processor detects a data virus.

In another aspect, the invention includes a first data channel coupled to the data sending entity and a second data channel coupled to the data receiving entity. A processor that is programmed to compare a plurality of data words received from the first data channel to at least one data word characteristic of a data virus asserts a control signal when a data word received from the first data channel corresponds to a data word characteristic of a data virus. A memory, that is operationally coupled to the processor, stores at least one data word characteristic of a data virus. The memory presents to the processor at least one data word characteristic of a data virus and an input buffer stores data received by the processor from the first data channel. An optical isolator, coupled to the first data channel and the second data channel and having an enable signal input, is capable of isolating the first data channel from the second data channel when the enable signal input is not asserted and is also capable of placing the first data channel and the second data channel in optical communication with each other when the enable signal input is asserted. A controllable power supply that is responsive to the control signal from the processor is coupled to the enable signal input of the optical isolator. The power supply asserts the enable signal when the control signal is not asserted and does not assert the enable signal when the control signal is asserted, thereby causing the optical isolator to isolate the first data channel from the second data channel.

In yet another aspect, the invention is a method for isolating data receiving entity from a data sending entity. When a data virus received from the data sending entity is detected, the data sending entity is isolated from the data receiving entity.

An advantage of the invention is that it prevents a data receiving entity, such as a computer, from receiving a virus from a data sending entity, such as a computer network.

A further advantage of the invention is that it isolates the data sending entity from the data receiving entity without disrupting normal operation of either entity.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
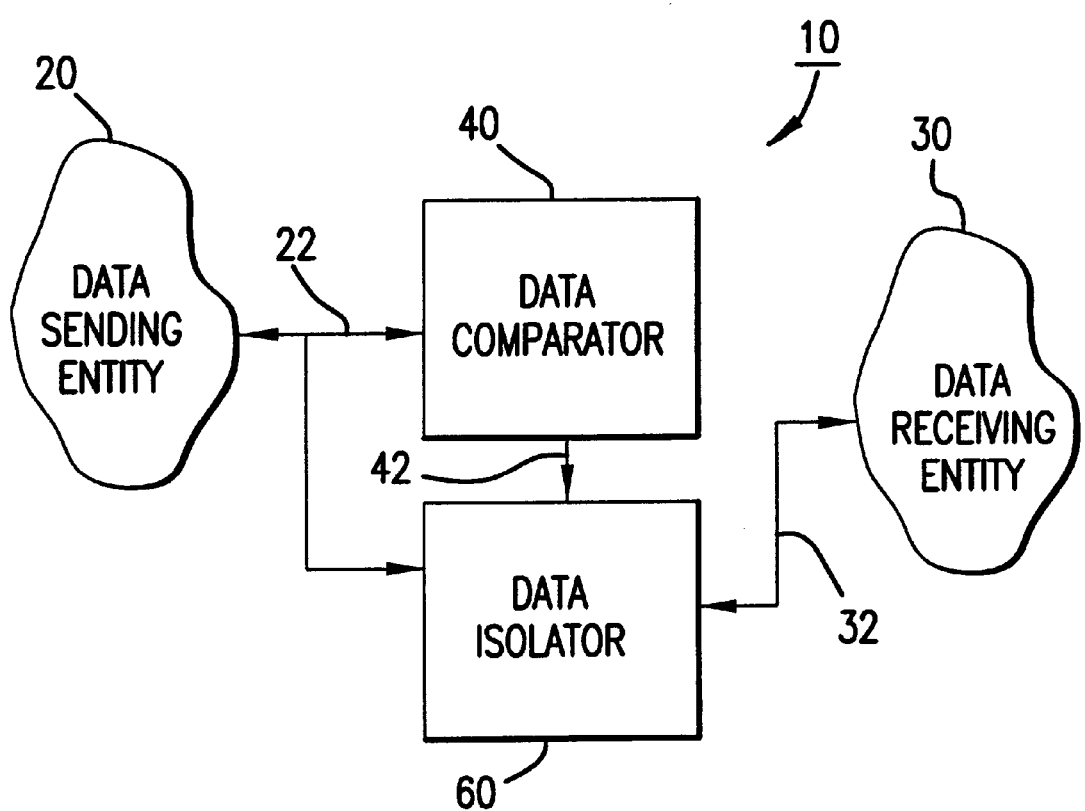
FIG. 1 is a simplified schematic diagram of the invention.

A preferred embodiment of the invention is now described in detail. Referring to the drawings, like numbers indicate like parts throughout the views. As used in the description herein and throughout the claims that follow, "a," "an," and "the" includes plural reference unless the context clearly dictates otherwise. Also, as used in the description herein and throughout the claims that follow, the meaning of "in" includes "in" and "on" unless the context clearly dictates otherwise.

As shown in FIG. 1, the apparatus 10 of the invention evaluates data received from a data sending entity 20, such as the Internet, by a data receiving entity 30, such as a personal computer or even a local area network. The data is received via a first data channel 22 coupled to the data sending entity 20 and a second data channel 32 coupled to the data receiving entity. A data comparitor 40 is operationally coupled to the first data channel 22 and is used to detect data viruses received from the first data channel 22. When a virus is detected, a data isolator 60, that is responsive to a control signal 42 from the data comparator 40, isolates the first data channel 22 from the second data channel 32. Thus, viruses are detected and prevented from being received by the data receiving entity 30.

Figure 2:
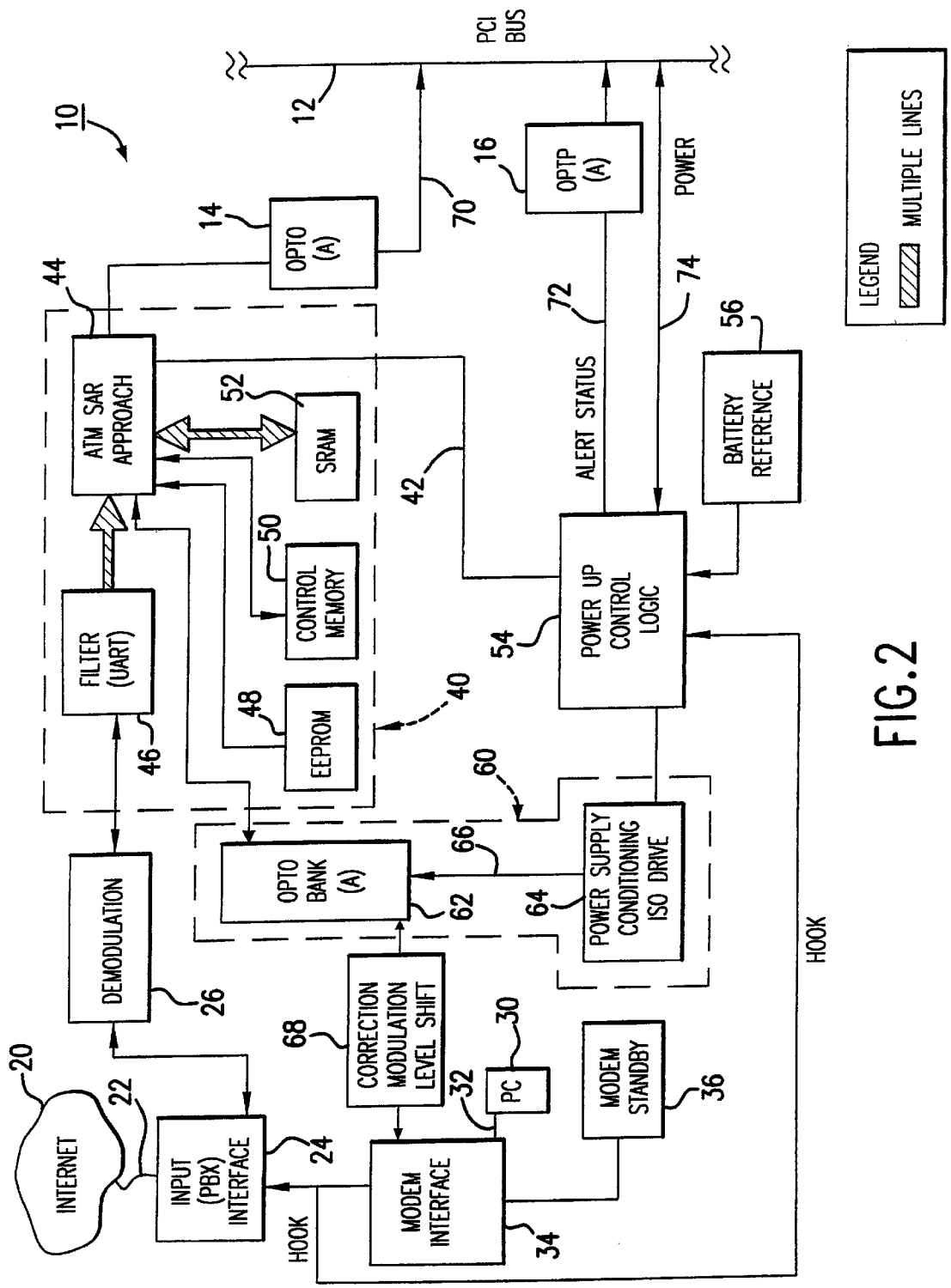
FIG. 2 is a detailed schematic diagram of the invention.

As shown in FIG. 2, the apparatus 10 of one preferred embodiment of the invention interfaces with a peripheral control interface (PCI) 12 of a data receiving entity 30, such as a personal computer, to provide isolation from a data sending entity 20, such as the Internet. The data sending entity 20 is connected to an input interface 24, such as a standard PBX interface, via a first data channel 22. The data stream received by the input interface 24 is demodulated using a demodulator circuit 26 so as to conform to the data format of the data receiving entity 30.

The data stream is then fed into the data comparator 40. In the comparitor circuit 40, a UART chip 46 formats the incoming serial data into parallel data words and a processor 44, such as a PCI host controller, using an asynchronous transfer mode segmentation and reassembly, compares the parallel data with known virus signatures stored in a memory 48, such as an EEPROM. The processor 44, which is controlled by a control memory 50, buffers data from the UART chip 46 in a memory chip 52 as it awaits virus scanning analysis.

After the processor 44 has analyzed an incoming word, it is then sent to the data isolator 60 for eventual transfer to the data receiving entity 30. The data isolator 60 comprises an optical isolator 62 that is driven by a power enable signal 66 received from a power supply conditioning ISO drive 64. The power supply conditioning ISO drive 64 receives power from a power up control logic circuit 54 which receives power from a power line 74 in the PCI bus 12.

If no virus is found, the data stream is transferred through the optical isolator 62 to a modulation level shifting circuit 68, that conditions the data for receipt by the data receiving entity 30, to a modem interface 34. The modem interface 34 provides protocol matching to the input interface 24 and sends the data to the data receiving entity 30.

When a virus is detected in the incoming data stream, a control line 42 from the processor 44 causes the power up control logic circuit 54 to cause the power supply conditioning ISO drive 64 to cut off power to the optical isolator 62, thereby causing the optical isolator 62 to prevent passage of data therethrough. A modem standby circuit 36 then takes over and simulates protocol exchanges with the input interface 24, thereby preventing an abnormal disconnect.

During power-up, the processor 40 runs the system through a self checking routine. If any system abnormalities are detected, an interrupt line 70 is asserted. The interrupt line 70 passes through an optical isolator 14 to ensure unidirectional data transmission to the PCI bus 12.

The power up control logic circuit 54 also performs a self check. a battery reference 56 is compared to the value on the incoming power line 74 from the PCI bus 12, and if the system is improperly powered, an interrupt line 72 is asserted. The interrupt line 72 is also passed through an optical isolator 16 that ensures that the interrupt line 72 is unidirectional to the PCI bus 12.

The above described embodiment is given as an illustrative example only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. An apparatus for isolating data receiving entity from a data sending entity, comprising:
   a. a first data channel, coupled to the data sending entity;
   b. a second data channel, coupled to the data receiving entity;
   c. means for comparing a plurality of data words received from the first data channel to at least one data word characteristic of a data virus and for asserting a control signal when a data word received from the first data channel corresponds to a data word characteristic of a data virus;
   d. an optical isolator, coupled to the first data channel and the second data channel and operationally coupled to the control signal, that is capable of isolating the first data channel from the second data channel when the control signal is asserted and that places the first data channel and the second data channel in optical communication when the control signal is not asserted; and
   e. a controllable power supply responsive to the control signal from the comparing means, the power supply generating an enable signal when the control signal is not asserted, wherein the optical isolator is powered by the enable signal so that when the optical isolator receives power from the enable signal, the first data channel and the second data channel are in optical communication with each other.

2. The apparatus of claim 1, wherein the comparing means comprises:
   a. a processor; and
   b. means for presenting to the processor at least one data word characteristic of a data virus.

3. The apparatus of claim 2, wherein the processor comprises a PCI host controller.

4. The apparatus of claim 2, wherein the presenting means comprises a memory, operationally coupled to the processor, that stores at least one data word characteristic of a data virus.

5. The apparatus of claim 2, further comprising an input buffer that stores data received by the processor.

6. The apparatus of claim 1, wherein data on the first data channel is transmitted in a serial format and wherein the apparatus further comprises means for converting segments of serial data received from the first data channel to data in a parallel format.

7. An apparatus for isolating data receiving entity from a data sending entity, comprising:
   a. a first data channel, coupled to the data sending entity;
   b. a second data channel, coupled to the data receiving entity;
   c. a processor that is programmed to compare a plurality of data words received from the first data channel to at least one data word characteristic of a data virus and to assert a control signal when a data word received from the first data channel corresponds to a data word characteristic of a data virus;
   d. a memory, operationally coupled to the processor, that stores at least one data word characteristic of a data virus that presents to the processor at least one data word characteristic of a data virus;
   e. an input buffer that stores data received by the processor from the first data channel;
   f. an optical isolator, coupled to the first data channel and the second data channel and having an enable signal input, that is capable of isolating the first data channel from the second data channel when the enable signal input is not asserted and is capable of placing the first data channel and the second data channel in optical communication with each other when the enable signal input is asserted; and
   g. a controllable power supply responsive to the control signal from the processor and coupled to the enable signal input of the optical isolator, the power supply asserting the enable signal when the control signal is not asserted and the power supply not asserting the enable signal when the control signal is asserted, thereby causing the optical isolator to isolate the first data channel from the second data channel.

8. The apparatus of claim 7, wherein the processor comprises a PCI host controller.

9. The apparatus of claim 7, wherein data on the first data channel is transmitted in a serial format and wherein the apparatus further comprises means for converting segments of serial data received from the first data channel to data in a parallel format.

* * * * *